United States Patent
Vukich et al.

(10) Patent No.: US 11,507,939 B2
(45) Date of Patent: *Nov. 22, 2022

(54) CONTACTLESS CARD TAP PAY FOR OFFLINE TRANSACTIONS

(71) Applicant: Capital One Services, LLC, McLean, VA (US)

(72) Inventors: Adam Vukich, Alexandria, VA (US); Taurean Butler, Brooklyn, NY (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/060,739

(22) Filed: Oct. 1, 2020

(65) Prior Publication Data

US 2021/0019734 A1    Jan. 21, 2021

Related U.S. Application Data

(63) Continuation of application No. 16/504,598, filed on Jul. 8, 2019, now Pat. No. 10,839,371.

(51) Int. Cl.
*G06Q 20/40* (2012.01)
*G06Q 20/32* (2012.01)
*G06Q 20/20* (2012.01)
*G06Q 20/34* (2012.01)

(52) U.S. Cl.
CPC ......... *G06Q 20/352* (2013.01); *G06Q 20/20* (2013.01); *G06Q 20/202* (2013.01); *G06Q 20/3224* (2013.01); *G06Q 20/40145* (2013.01)

(58) Field of Classification Search
CPC .... G06Q 20/352; G06Q 20/20; G06Q 20/202; G06Q 20/3224; G06Q 20/40145
See application file for complete search history.

(56) References Cited

U.S. PATENT DOCUMENTS

| | | | |
|---|---|---|---|
| 8,332,272 B2 * | 12/2012 | Fisher | G06Q 40/10 455/406 |
| 10,192,219 B2 * | 1/2019 | Douglas | G06Q 20/36 |
| 10,366,378 B1 * | 7/2019 | Han | G06Q 20/425 |

(Continued)

*Primary Examiner* — Florian M Zeender
*Assistant Examiner* — Christopher R Buchanan
(74) *Attorney, Agent, or Firm* — KDB

(57) ABSTRACT

Using contactless cards to pay for offline transactions. An application executing on a mobile device may receive, via a communications interface of a contactless card, an account identifier of the contactless card, and transaction data received by the contactless card from a POS device via the communications interface, the transaction data comprising at least an identifier of a merchant account, a timestamp, and an amount of the transaction, a network connection between the POS device and a payment server not available. The application may transmit the account identifier and the transaction data to the payment server via a cellular network connection of the mobile device. The mobile device may receive, from the payment server via the cellular network connection, authorization of a payment for the transaction. The application may generate a graphical indication of the authorization of the payment for the transaction and output the graphical indication of the authorization.

20 Claims, 9 Drawing Sheets

(56) References Cited

U.S. PATENT DOCUMENTS

| | | | | |
|---|---|---|---|---|
| 10,861,003 B1* | 12/2020 | Rezayee | ............... | G06Q 20/204 |
| 10,963,887 B1* | 3/2021 | Zigoris | .................. | G06Q 30/01 |
| 2012/0290472 A1* | 11/2012 | Mullen | ................ | G06Q 20/322 |
| | | | | 705/39 |
| 2013/0140361 A1* | 6/2013 | Ling | .................. | G06Q 20/3274 |
| | | | | 235/494 |
| 2013/0179281 A1* | 7/2013 | White | .................. | G06Q 20/382 |
| | | | | 705/21 |
| 2014/0052553 A1* | 2/2014 | Uzo | ..................... | G06Q 20/204 |
| | | | | 705/17 |
| 2015/0019439 A1* | 1/2015 | Phillips | ................ | G06Q 20/352 |
| | | | | 705/64 |
| 2017/0091765 A1* | 3/2017 | Lloyd | ................. | G06Q 20/3224 |
| 2018/0047022 A1* | 2/2018 | Schipperheijn | .... | G06Q 20/4012 |

* cited by examiner

US 11,507,939 B2

CONTACTLESS CARD TAP PAY FOR OFFLINE TRANSACTIONS

RELATED APPLICATIONS

This application is a continuation of U.S. patent application Ser. No. 16/504,598 titled "CONTACTLESS CARD TAP PAY FOR OFFLINE TRANSACTIONS" filed on Jul. 8, 2019. The contents of the aforementioned application are incorporated herein by reference in their entirety.

TECHNICAL FIELD

Embodiments herein generally relate to mobile computing platforms, and more specifically, to using a contactless card to facilitate offline transactions.

BACKGROUND

Internet connectivity is often required when processing payments for transactions using cards, mobile applications, and other non-cashed based payment methods. Often, however, a merchant's terminal may lose Internet connectivity for any number of reasons. In such situations, the merchant's terminal is unable to communicate with payment processing systems via the Internet, and the customer is forced to pay with cash or other methods that do not require Internet connectivity. Often, the transaction is not completed because the customer may not have access to cash.

SUMMARY

Embodiments disclosed herein provide systems, methods, apparatuses, articles of manufacture, and computer-readable media to pay for offline transactions using a contactless card. According to one embodiment, an application executing on a mobile device may receive, via a communications interface of a contactless card, an account identifier associated with the contactless card and transaction data for a transaction, the transaction data received by the contactless card from a point of sale (POS) device via the communications interface, the transaction data comprising at least an identifier of a merchant account, a timestamp, and an amount of the transaction, the account identifier stored in a memory of the contactless card, a network connection between the POS device and a payment server not available. The application executing on the mobile device may transmit the account identifier and the transaction data to the payment server via a cellular network connection of the mobile device. The mobile device may receive, from the payment server via the cellular network connection of the mobile device, authorization of a payment for the transaction. The application executing on the mobile device may then generate a graphical indication of the authorization of the payment for the transaction and output the graphical indication of the authorization of the payment for the transaction on a display of the mobile device.

DETAILED DESCRIPTION

Figure 1A:
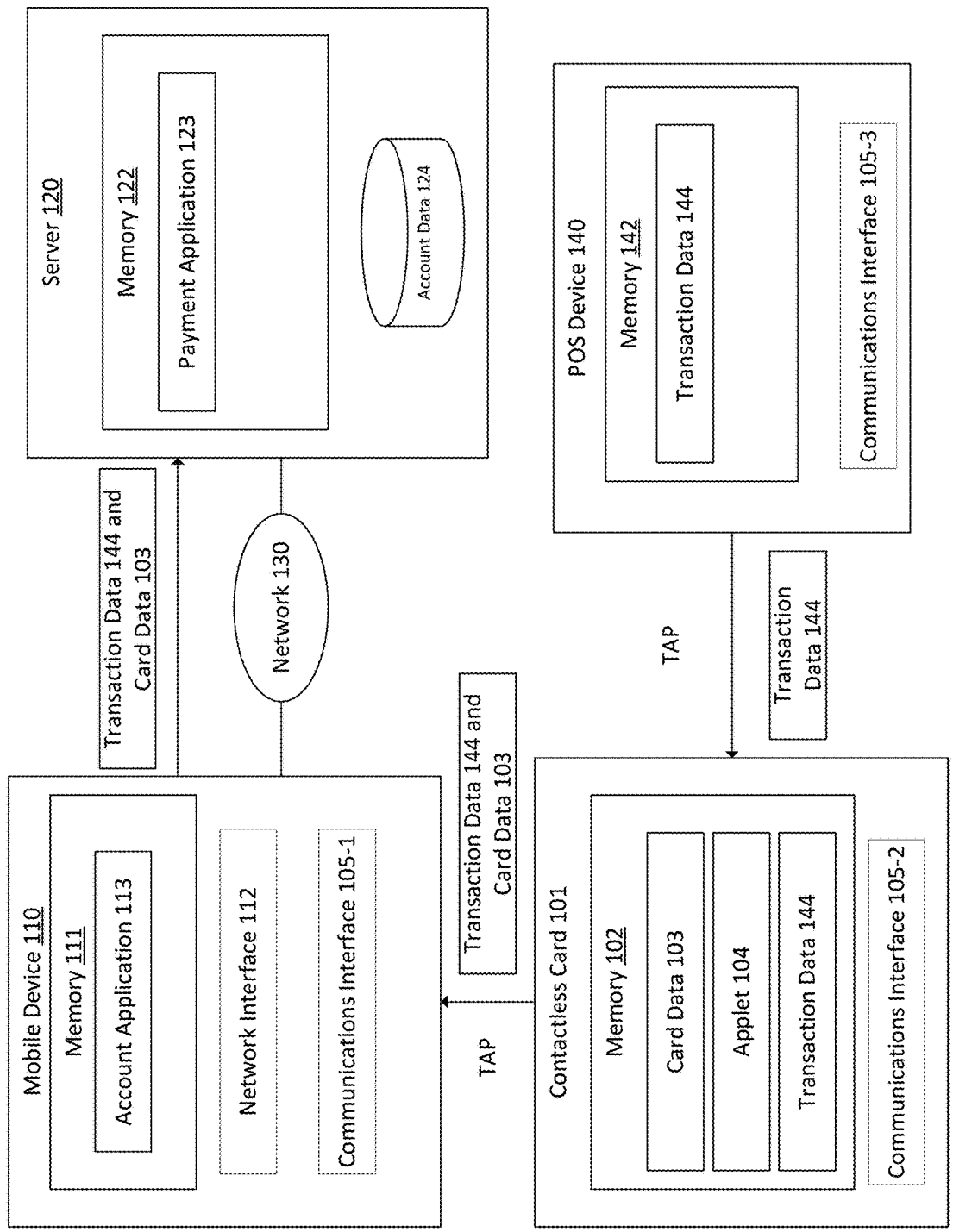
FIGS. 1A-1B illustrate embodiments of contactless card tap pay for offline transactions.

Embodiments disclosed herein provide secure techniques for processing payments for offline transactions using a contactless card. Generally, a merchant point of sale (POS) device may be unable to communicate with a payment processing system for any number of reasons, such as a loss of Internet connectivity. Advantageously, however, a contactless card may be tapped to the POS device, and receive transaction data from the POS device, e.g., via near-field communications (NFC), Bluetooth®, etc. The contactless card may then be tapped to a mobile device, which receives the transaction data and account information from the contactless card. The mobile device may then transmit the received data to the payment system via a network connection available to the mobile device (e.g., a cellular network connection not available to the POS device). The payment system may then authorize the payment and transmit an indication of the authorization to the mobile device. The mobile device may then output a graphical indication of the authorization, which may be used by the merchant to confirm the payment was processed, thereby completing the transaction.

Advantageously, embodiments disclosed herein facilitate secure processing of offline transactions that would otherwise not be completed and/or would require cash payments to be completed. Furthermore, in some embodiments, to enhance security, the payment system may validate the transaction based on a location of the mobile device being within a predefined distance of the POS device and/or the merchant's location. Further still, the payment system may prevent fraud by limiting the number of offline transactions to a predefined number of offline transactions (e.g., 1 offline transaction per day, 2 per week, etc.).

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, one or more payment servers 120, and one or more point of sale (POS) devices 140. The contactless cards 101 are representative of any type of payment card, such as a credit card, debit card, ATM card, gift card, and the like. The contactless cards 101 may comprise one or more communications interfaces 105-2, such as a radio frequency identification (RFID) chip, configured to communicate with the mobile devices 110 and/or the POS devices 140 via NFC, the EMV standard, or other short-range protocols in wireless communication, or using NFC Data Exchange Format (NDEF) tags. Although NFC is used as an example herein, the disclosure is equally applicable to other types of wireless communications, such as the EMV standard, Bluetooth, and/or Wi-Fi. Therefore, the communications interfaces 105-1 of the mobile devices 110, the communications interfaces 105-2 of the contactless cards 101, and the communications interfaces 105-3 of the POS devices 140 facilitate local wireless communications therebetween. In at least one embodiment, the communications interfaces 105-1 of the mobile device 110 and/or the communications interfaces 105-3 of the POS devices 140 are card reader devices configured to read and/or write data in a memory 102 of the contactless cards 101.

The mobile devices 110 are representative of any type of network-enabled computing devices, such as smartphones, tablet computers, wearable devices, laptops, portable gaming devices, and the like. As shown, a memory 111 of the mobile device 110 includes an instance of an account application 113. The account application 113 allows users to perform various account-related operations, such as viewing account balances and processing payments as described in greater detail below. Initially, a user must authenticate using authentication credentials to access the account application. For example, the authentication credentials may include a username and password, biometric credentials, and the like. The mobile device 110 is generally under the control of an operating system (not pictured). Example operating systems include the Android® OS, iOS®, Linux®, and Windows® operating systems.

The payment server 120 is representative of any type of computing device, such as a server, workstation, compute cluster, cloud computing platform, virtualized computing system, and the like. The POS devices 140 are representative of any type of device configured to receive data from a payment card, such as a payment terminal, card reader, mobile device, computing device, and the like. Generally, the POS devices 140 may receive data from the contactless cards 101 via a magnetic stripe reader, the communications interfaces 105-3, and/or a slot configured to read data from the memory 102 of the contactless card 101.

For example, a user may attempt to purchase a coffee using the POS device 140 of a merchant. The POS terminal 140 may generate transaction data 144 in a memory 142. The transaction data 144 may include any type of data describing the transaction. For example, and without limitation, the transaction data 144 may include an identifier of the merchant, a timestamp associated with the transaction (e.g., reflecting a date and/or time of the transaction), and an amount of the transaction. However, the transaction data 144 may include additional attributes, such as one or more items, goods, or services being purchased, a location of the POS device 140 and/or merchant store, and the like. However, the POS device 140 may not have a connection to the payment application 123 of the server 120 via the network 130 and is therefore "offline". Although absence of a network connection is one example used herein, the POS device 140 may be "offline" for other reasons, such as a faulty magnetic stripe reader, other hardware issues, software issues, and the like. Therefore, in conventional solutions, the user would have to pay for the coffee using cash and/or forego purchasing the coffee.

Advantageously, however, embodiments disclosed herein facilitate the processing of such "offline" transactions. As shown, the contactless card 101 may be tapped to the POS device 140, which causes the POS device 140 to transmit the transaction data 144 to the contactless card 101. An applet 104 executing in the memory 102 of the contactless card 101 may receive the transaction data 144 and store the transaction data 144 in the memory 102. In at least one embodiment, to prevent fraud, the memory 102 and/or the applet 104 may be configured to store transaction data 144 for a single transaction in the memory 102. Therefore, in such embodiments, the received transaction data 144 may overwrite existing transaction data 144 in the memory 102.

The applet 104 may further identify card data 103 stored in the memory 102 of the contactless card 101. The card data 103 generally includes account-related information, such as information used to process a payment using the contactless card 101. For example, the card data 103 may comprise an account number, expiration date, and card verification value (CVV). The account number may be any type of account number, such as a primary account number (PAN), a one-time use virtual account number, and/or a token generated based on the PAN. Other types of account numbers are contemplated, and the use of the account number or other types of card data 103 should not be considered limiting of the disclosure. The card data 103 may further include a user's first name, last name, addresses, and any other account-related information.

The applet 104 may then transmit the card data 103 and the transaction data 144 to the account application 113 of the mobile device 110 when the communications interface 105-2 of contactless card 101 is within communications range of the communications interface 105-1 of the mobile device 110 (e.g., when the card 101 is tapped to the mobile device 110). In one embodiment, the applet 104 transmits the card data 103 and the transaction data 144 separately (e.g., in separate transmissions). In another embodiment, the applet 104 transmits the card data 103 and the transaction data 144 together (e.g., in a single transmission). As stated, a user associated with the contactless card 101 may be logged into their account via the account application 113. In some embodiments, the applet 104 may encrypt the card data 103 and/or the transaction data 144 prior to transmitting the card data 103 and/or the transaction data 144 to the account application 113. In some embodiments, the applet 104 may perform encryption using a key diversification technique. Examples of key diversification techniques are described in U.S. patent application Ser. No. 16/205,119, filed Nov. 29, 2018. The aforementioned patent application is incorporated by reference herein in its entirety.

Once received, the account application 113 may output a graphical user interface (GUI) which requests user authorization of the offline transaction. However, in other embodiments, the account application 113 may forego receiving user authorization. In embodiments where the applet 104 encrypts the data, the account application 113 may decrypt the encrypted data (e.g., to show the user an amount of the transaction, etc.). The account application 113 may then transmit, via the network interface 112 over the network 130, the card data 103 and/or the transaction data 144 to the payment application 123 executing in a memory 122 of the server 120. In one embodiment, at least a portion of the network 130 is a cellular network, and the network interface 112 of the mobile device 110 is a cellular network interface that allows the mobile device 110 to transmit the data via the network 130. In some embodiments, the account application 113 may further provide location data describing a location of the mobile device 110. For example, the account application 113 may transmit global positioning system (GPS) coordinates of a GPS module (not pictured) of the mobile device 110 to the payment application 123 via the network 130.

Once the payment application 123 receives the transaction data 144 and card data 103 via the network 130, the payment application 123 may approve and/or decline the requested offline transaction. Generally, the payment application 123 may use any number and type of criteria when determining whether to approve and/or decline the transaction. For example, if a private key in the account data 124 for the account associated with the contactless card 101 is unable to decrypt the encrypted transaction data 144 and card data 103, the payment application 123 may decline the transaction. However, if the private key decrypts the data, the payment application 123 may authorize the transaction. As another example, the account data 124 may specify a number of previous offline transactions performed using the account associated with the contactless card 101. If the number of previous offline transactions exceeds a threshold, the payment application 123 may decline the transaction. For example, if the threshold is 2 offline transactions per day, and 2 offline transactions have been performed using the account during that day, the payment application 123 may decline the transaction. Otherwise, if the offline transaction threshold is not exceeded, the payment application 123 may authorize the transaction.

As another example, as stated, the transaction data 144 may include a timestamp. If an amount of time that has elapsed relative to the timestamp exceeds a threshold amount of time for completing offline transactions, the payment application 123 may decline the transaction. Otherwise, if the time threshold is not exceeded, the payment application 123 may authorize the transaction. As another example, the payment application 123 may leverage the location data provided by the mobile device 110 and determine whether the location data reflects that the mobile device 110 is within a threshold distance (e.g., 1 meter, 10 meters, etc.) of the POS device 140 (or a known address and/or location of the merchant). If the location data reflects that the mobile device 110 is not within the threshold distance, the payment application 123 may decline the transaction. Otherwise, if the mobile device 110 is within the threshold distance of the POS device 140 and/or the merchant's address, the payment application 123 may authorize the transaction.

As another example, the payment application 123 may determine whether the mobile device 110 is a known device that is associated with the account in the account data 124. If the mobile device 110 is not a known device, the payment application 123 may implement two-factor authentication (e.g., when the user logs in to the account application 113 and/or when processing the requested offline transaction). For example, the payment application 123 may cause a code to be transmitted to a different known device of the user. The user would be required to enter the code via the account application 113 prior to logging into the account application 113 and/or prior to the payment application 123 authorizing the offline transaction.

More generally, the payment application 123 may also perform conventional payment processing techniques when determining whether to authorize the offline transaction. For example, if the account associated with the contactless card 101 has insufficient funds to pay for the amount specified in the transaction data 144, the payment application 123 may decline the offline transaction. As another example, the payment application 123 is configured to process a given transaction only once. Doing so ensures that an offline transaction is not authorized multiple times.

Figure 1B:
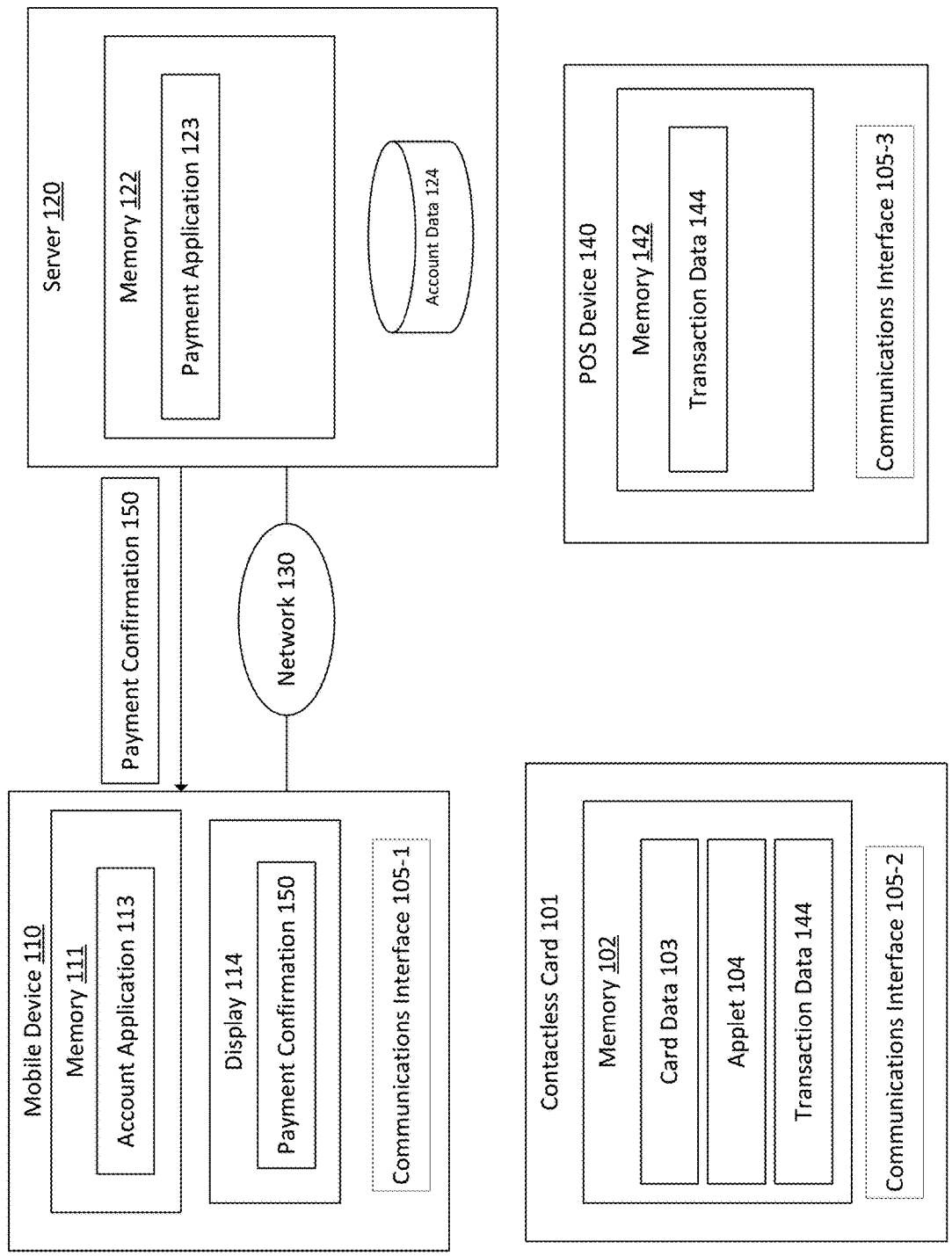

FIG. 1B depicts an embodiment where the payment application 123 has authorized the offline transaction of FIG. 1A. Generally, when the payment application 123 authorizes the transaction, the payment application 123 may credit funds to the account associated with the merchant identifier in the transaction data 144. As shown, the payment application 123 may transmit a payment confirmation 150 to the account application 113 of the mobile device 110 via the network 130. The payment confirmation 150 may include at least a portion of the transaction data 144 (e.g., the amount of the transaction, the merchant ID, etc.).

The payment confirmation 150 may be any type of confirmation, such as a bar code, a fiducial marker (e.g., a quick response (QR®) code), an email, a uniform resource locator (URL) directed to a payment confirmation page hosted by the server 120, a text message, an alphanumeric confirmation string, and/or an authorization page of the account application 113. As shown, a display 114 of the mobile device 110 may output the payment confirmation 150 for display. The user of the mobile device 110 may then provide the payment confirmation 150 to the merchant, thereby confirming the payment has been processed.

In some embodiments, a device of the merchant may read the payment confirmation 150 for further processing. For example, a mobile device 110 of the merchant may access the payment confirmation page at the specified URL via the network 130, allowing the merchant to programmatically confirm that the payment has been processed. As another example, the POS device 140 may receive the alphanumeric confirmation string via the communications interface 105-3 and update the merchant's payment database (not pictured) accordingly. Embodiments are not limited in this context.

Figure 2A:
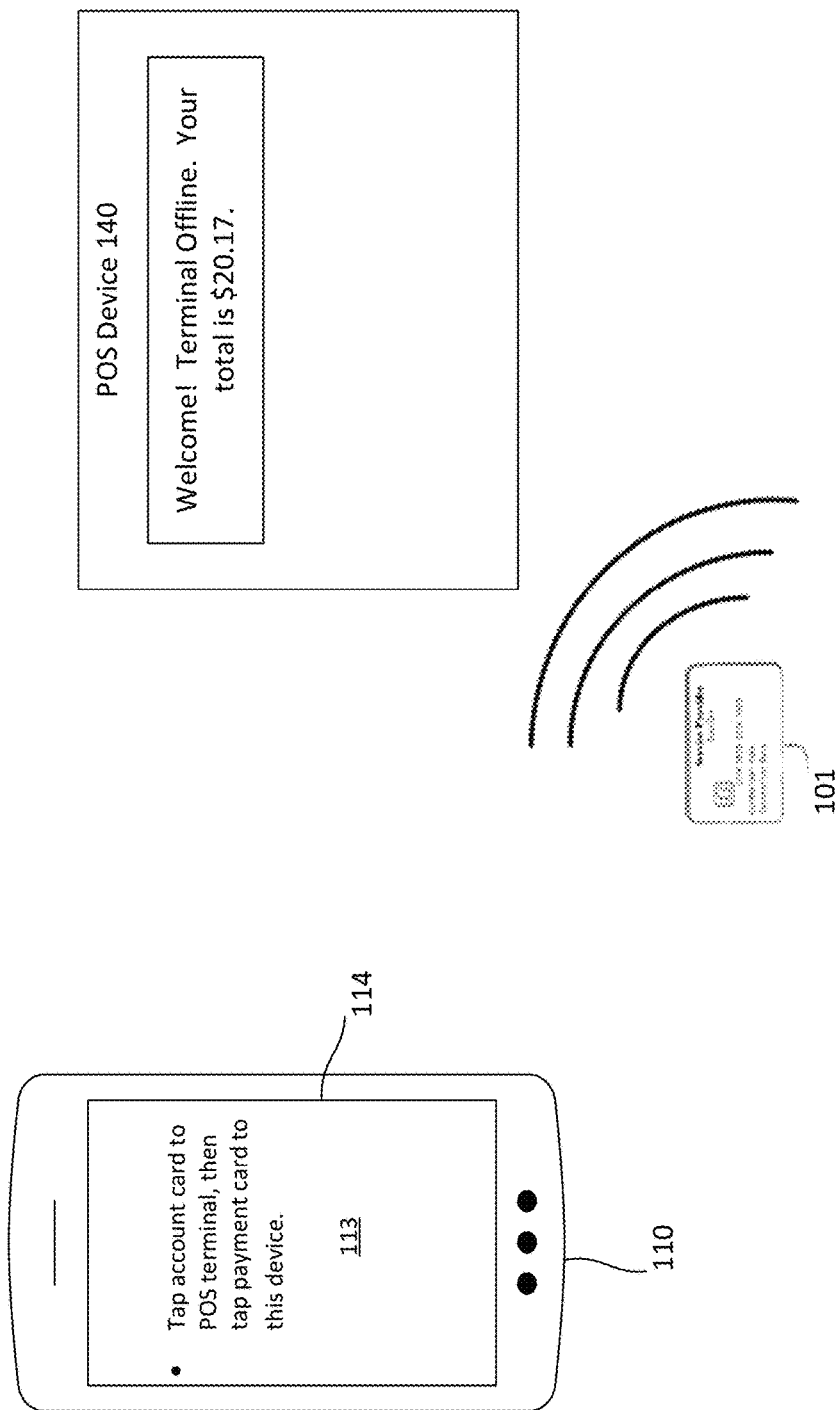
FIGS. 2A-2D illustrate embodiments of contactless card tap pay for offline transactions.

FIG. 2A is a schematic 200 illustrating techniques to perform offline transactions using a contactless card 101, according to one embodiment. As shown, the account application 113 may output instructions on the display 114 of the mobile device 110. The instructions specify to the user to tap their contactless card 101 to the POS device 140. As shown, the user may tap the contactless card 101 to the POS device 140. Doing so causes the POS device 140 to transmit the transaction data 144 to the contactless card 101. As stated, the transaction data 144 includes at least a merchant identifier, a total of the transaction ($20.17 in the example depicted in FIG. 2A), and a timestamp.

Figure 2B:
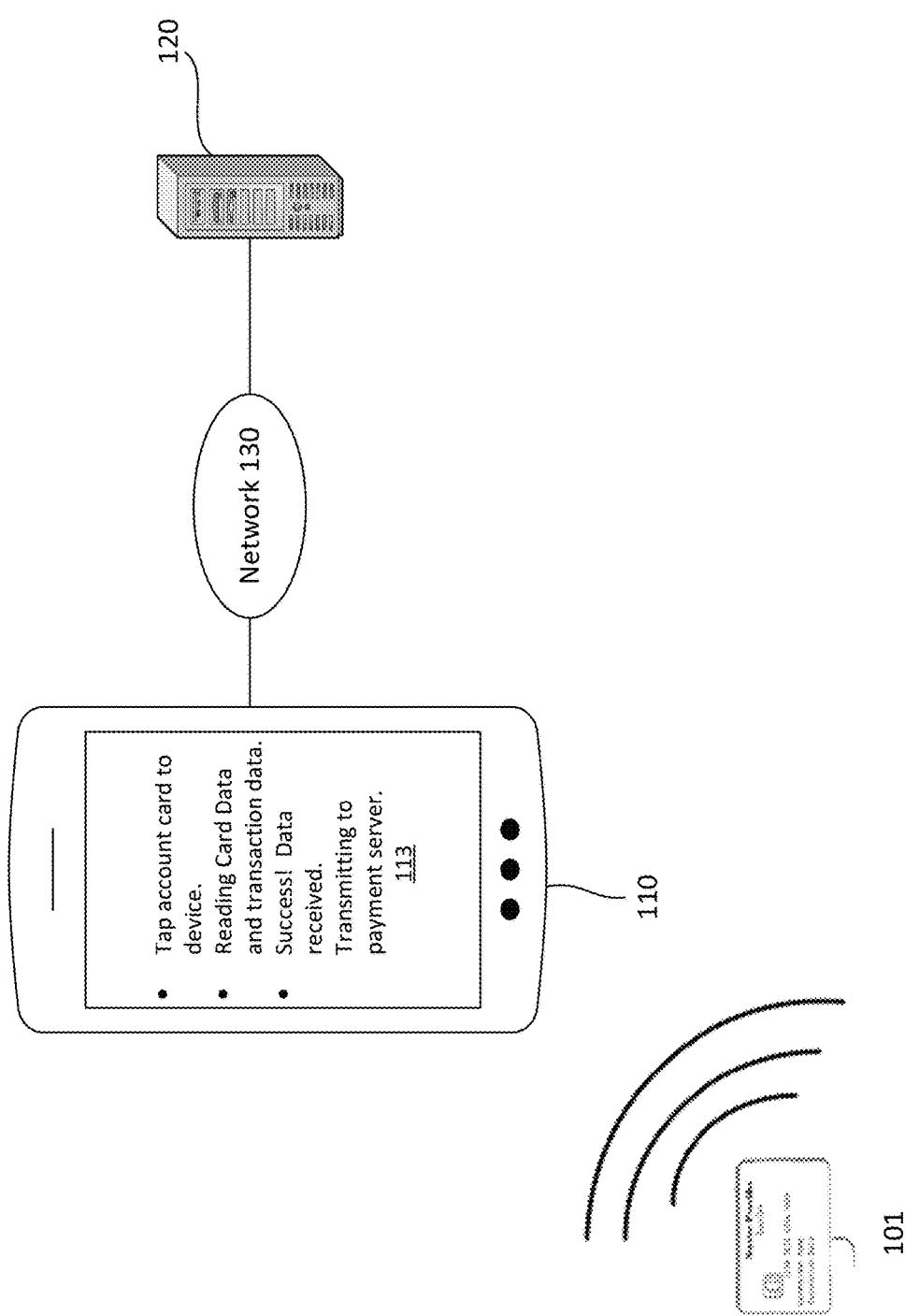

FIG. 2B is a schematic 210 illustrating an embodiment where the contactless card 101 is tapped to the mobile device 110 after receiving the transaction data 144 from the POS device 140. Generally, as stated, when the contactless card 101 is tapped to the mobile device 110, the applet 104 of the contactless card 101 transmits the card data 103 and the transaction data 144 to the mobile device 110 via the communications interfaces 105-1 and 105-2. The card data 103 includes at least an account number, expiration date, and CVV value associated with the contactless card 101. Once received, the account application 113 may transmit the transaction data 144 and the card data 103 to the server 120 for processing.

Figure 2D:
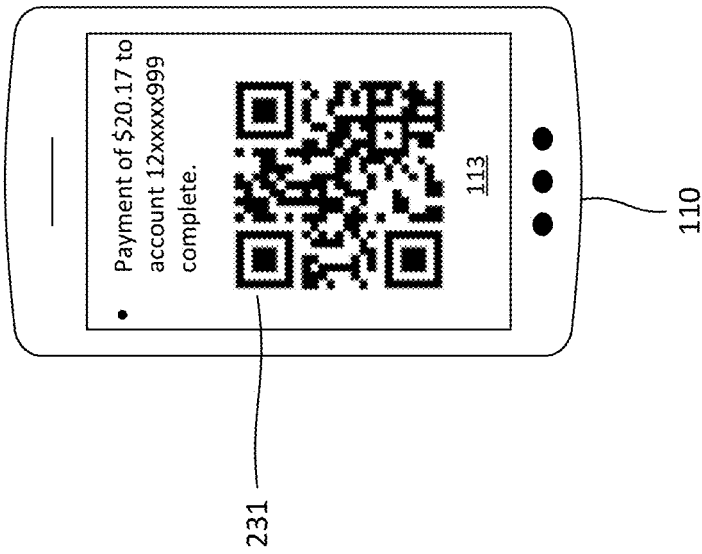
Figure 2C:
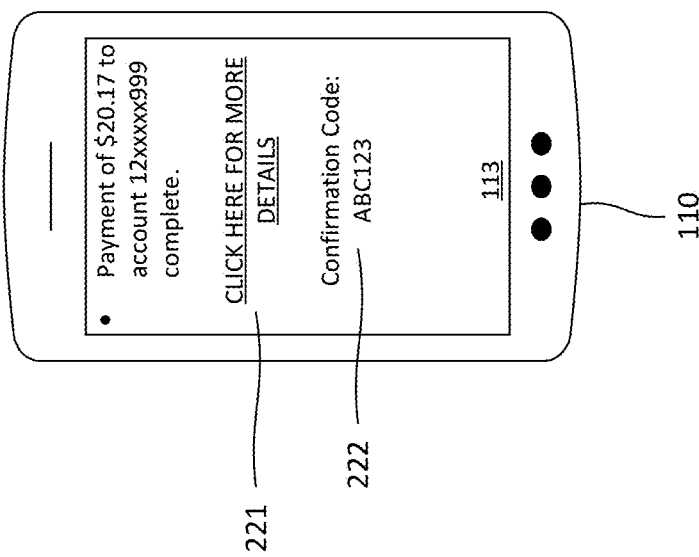

FIG. 2C is a schematic 220 illustrating an embodiment where the payment application 123 of the server 120 has authorized the requested offline transaction of FIGS. 2A-2B. As shown, the mobile device 110 depicts one or more payment confirmations. For example, as shown, the account application 113 indicates that a payment in the amount of $20.17 was made to the account of the merchant (e.g., the merchant identifier in the transaction data 144). As shown, the account application 113 further includes a URL 221 that is directed to a payment confirmation page, which may be hosted by the server 120, or another server associated with the issuer of the contactless card 101. Furthermore, as shown, the account application 113 outputs a payment confirmation code 222. The payment confirmation code 222 and/or the URL 221 may be generated by the account application 113 and/or the payment application 123.

FIG. 2D is a schematic 230 illustrating a fiducial marker 231 that is generated by the account application 113 and/or the payment application 123 after the payment application 123 authorizes the requested offline transaction of FIGS. 2A-2B. The fiducial marker 231 may direct a computing device to a page with further details regarding the approved offline transaction. As another example, details regarding the transaction (e.g., the payor account, payee account, payment amount, etc.) may be encoded in the fiducial marker 231. When read by a device (e.g., a mobile device 110, or another device) of the merchant, the merchant may extract the relevant details and update an associated payment database to reflect that payment the offline transaction was processed.

Figure 3:
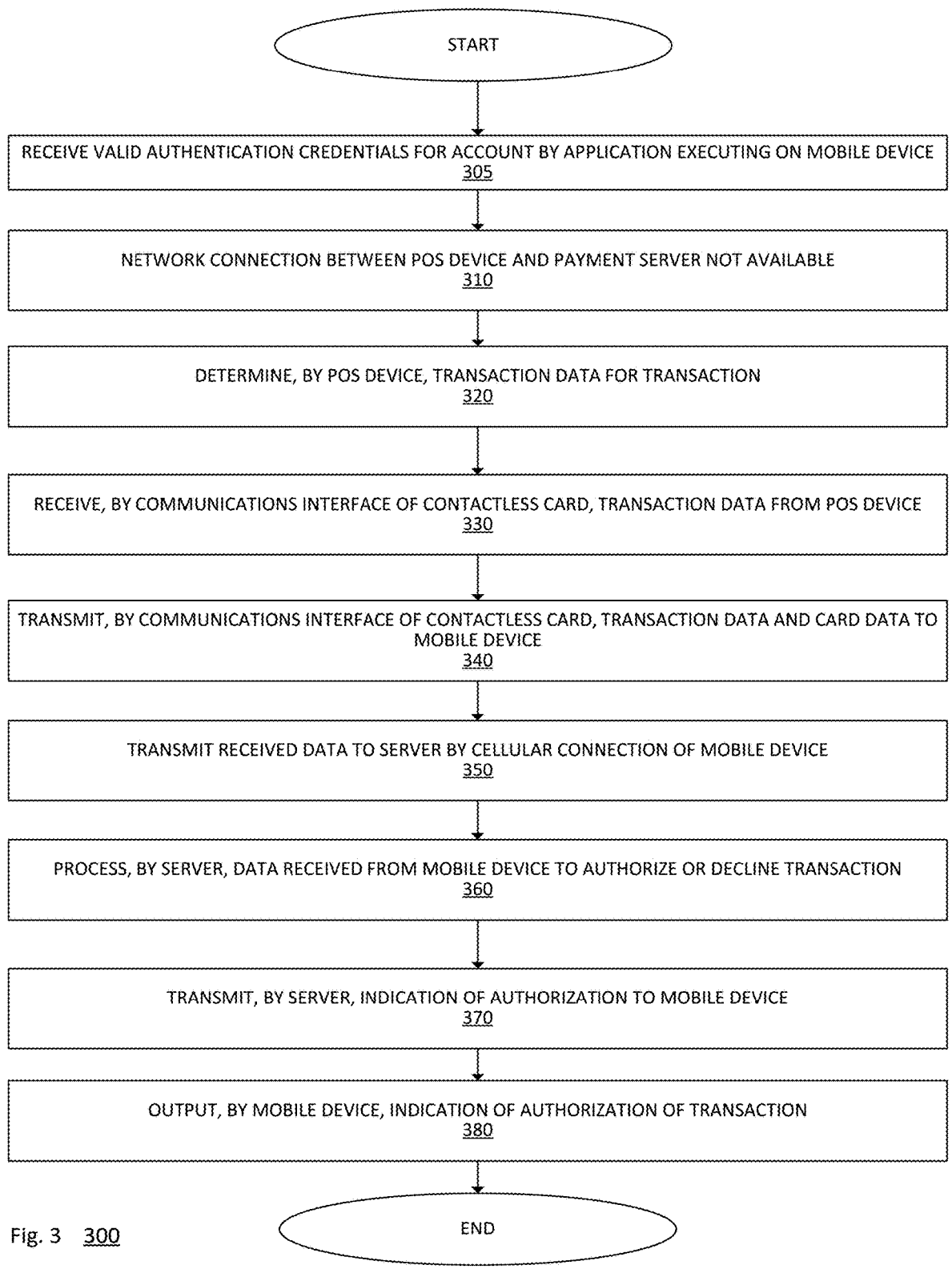
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to process offline transactions using a tap of a contactless card 101 to a POS device 140. Embodiments are not limited in this context.

As shown, the logic flow 300 begins at block 305, where the account application 113 executing on a mobile device 110 receives valid authentication credentials for an account associated with a contactless card 101. The authentication credentials include any type of credential, such as a login/password combination, biometric identifiers, voice input, and the like. At block 310, a network connection between a merchant POS device 140 and the payment server 120 may not be available. As such, the POS device 140 is offline relative to the payment server 120, meaning that the POS device 140 cannot directly submit transactions to the payment server 120 for processing. However, as stated, the POS device 140 may be offline for any number of reasons in addition to loss of network connectivity, such as hardware issues, software issues, and the like.

At block 320, the POS device 140 may determine transaction data 144 for a transaction. For example, the POS device 140 may determine a timestamp of a pending transaction, the merchant identifier of a merchant account, one or more items and/or services being purchased, and a total amount of the purchase. At block 330, the communications interface 105-2 of the contactless card 101 receives the transaction data 144 from the communications interface 105-3 of the POS device 140. For example, the contactless card 101 may be brought within NFC communications range of the POS device 140, and the devices may communicate to transfer the transaction data 144. Once received, an applet 104 of the contactless card 101 may optionally encrypt the received data using a private key stored in the memory 102 of the contactless card.

At block 340, the applet 104 of the contactless card 101 transmits the card data 103 and the transaction data 144 to the account application 113 of the mobile device 110. For example, the communications interface 105-2 of the contactless card 101 may come within NFC communications range of the communications interface 105-3 of the mobile device 110, and the account application 113 may instruct the applet 104 to transmit the card data 103 and the transaction data 144. As stated, the applet 104 may encrypt the card data 103 and the transaction data 144. Furthermore, the applet 104 may transmit the card data 103 and the transaction data 144 in a single transmission (e.g., in a single NDEF file), or in separate transmissions (e.g., in two or more NDEF files).

At block 350, the account application 113 of the mobile device 110 transmits the card data 103 and the transaction data 144 to the payment server 120 via a cellular network interface 112 of the mobile device 110. In some embodiments, the account application 113 of the mobile device 110 transmits location data (e.g., GPS coordinates of the mobile device 110) to the payment server 120. At block 360, the payment application 123 of the payment server 120 processes the transaction data 144 and the card data 103 to determine whether to authorize or decline the transaction. As stated, the payment application 123 may consider any number of factors when processing the transaction. For example, the payment application 123 may condition approval of the transaction based on decrypting the encrypted data generated by the contactless card 101 using a private key of the contactless card 101 stored by the server 120. If the encryption is successful, the payment application 123 may authorize the transaction. If the encryption is not successful, the payment application 123 may decline the transaction. As another example, the payment application 123 may perform geo-fencing to determine whether the location data (e.g., GPS coordinates) of the mobile device 110 indicates the mobile device 110 is within a predefined distance of a known location of the POS device 140 and/or the merchant's physical location.

As another example, the payment application 123 may consider whether a number of previous offline transactions performed using the contactless card 101 exceeds a threshold. If the number of previous offline transactions exceeds the threshold, the payment application 123 may decline the transaction. As another example, if an amount of time that has elapsed relative to the timestamp in the transaction data 144 exceeds a threshold amount of time for completing offline transactions, the payment application 123 may decline the transaction.

At block 370, the payment application 123 authorizes the offline transaction, thereby transferring funds from the account associated with the contactless card 101 to the account identifier of the merchant. The payment application 123 may then transmit an indication of the authorization to the mobile device. At block 380, the account application 113 may output an indication of the authorization for display. As stated, the indication of the authorization may include, but is not limited to, a bar code, a fiducial marker, an email, a URL directed to a payment confirmation page hosted by the server 120, a text message, an alphanumeric confirmation string, and/or an authorization page of the account application 113. The account application 113 and/or the payment application 123 may generate the output depicted on the display of the mobile device 110.

Figure 4:
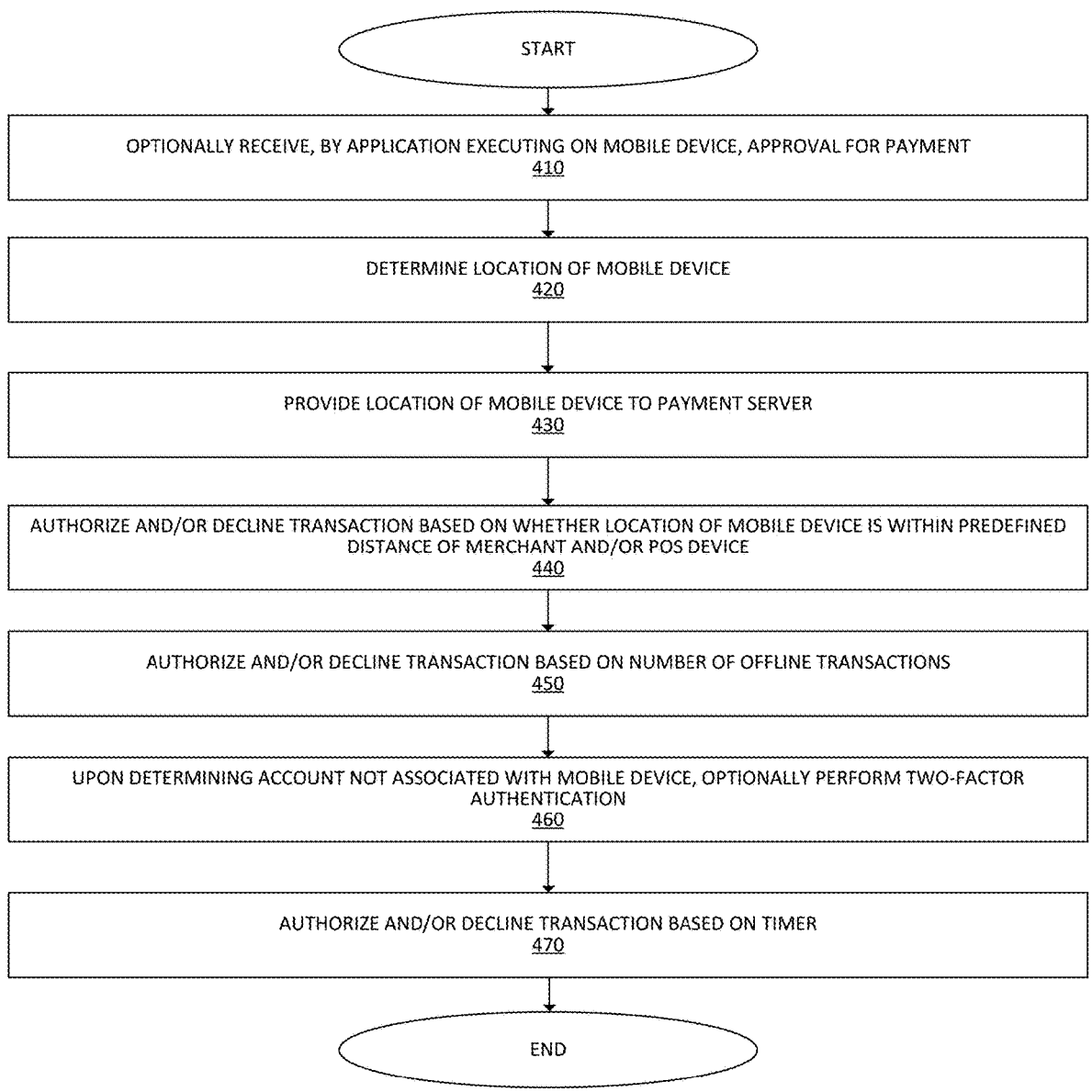
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may include some or all of the operations to process an offline transaction. Embodiments are not limited in this context.

As shown, the logic flow 400 begins at block 410, where the account application 113 optionally receives user approval of the offline transaction. For example, the account application 113 may output the transaction data 144 and/or the card data 103 for approval. The account application 113 may mask the transaction data 144 and/or the card data 103 for security. At block 420, the account application 113 determines a location of the mobile device 110. For example, the account application 113 may receive GPS coordinates from a GPS module of the mobile device 110. At block 430, the account application 113 may provide the location data to the payment server 120 via the network 130. At block 440, the payment application 123 authorizes and/or declines the offline transaction based on whether the location of the mobile device is within a predefined distance of the merchant's physical location and/or a location of the POS device 140. If the location is within the predefined distance, the payment application 123 may authorize the offline transaction. Otherwise, the payment application 123 may decline the offline transaction.

At block 450, the payment application 123 authorizes and/or declines the offline transaction based on a number of offline transactions performed using the contactless card 101 compared to a threshold number of permitted offline transactions. If the number of offline transactions is less than the threshold, the payment application 123 may authorize the offline transaction. Otherwise, the payment application 123 may decline the offline transaction. At block 460, the payment application 123 may optionally perform two-factor authentication upon determining the mobile device 110 is not a known device associated with the user's account. If the two-factor authentication succeeds, the payment application 123 may authorize the offline transaction. Otherwise, the payment application 123 may decline the offline transaction. At block 470, the payment application 123 may authorize and/or decline the offline transaction based on an amount of time that has elapsed relative to the timestamp in the transaction data 144. For example, if the amount of time is within a time threshold, the payment application 123 may authorize the offline transaction. Otherwise, the payment application 123 may decline the offline transaction.

Figure 5:
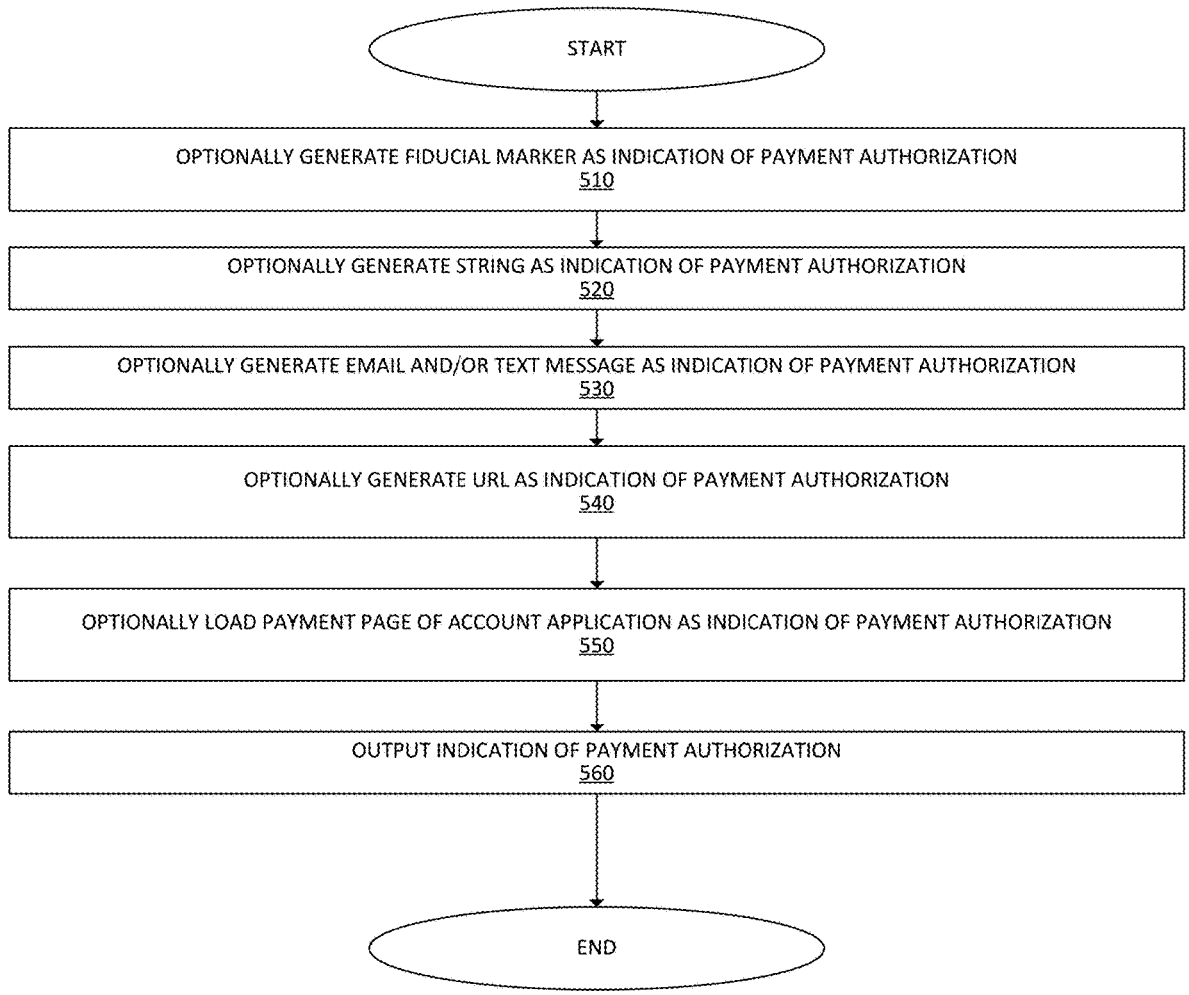
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations to generate a graphical indication of a payment confirmation. Embodiments are not limited in this context.

As shown, the logic flow 500 may begin at block 510, the account application 113 and/or the payment application 123 may optionally generate a fiducial marker as an indication that payment for the offline transaction was authorized. At block 520, the account application 113 and/or the payment application 123 may optionally generate an alphanumeric character string as the indication that the payment for the offline transaction was authorized. At block 530, the account application 113 and/or the payment application 123 may optionally generate an email and/or a text message as an indication that the payment for the offline transaction was authorized. In such an example, the email and/or the text message may be transmitted to the customer and/or the merchant. At block 540, the account application 113 and/or the payment application 123 optionally generates a URL as the indication that the payment for the offline transaction was authorized. The URL may be directed to a payment confirmation page associated with the issuer of the contactless card 101. At block 550, a payment confirmation page of the account application 113 is optionally loaded as the indication that the payment for the offline transaction was authorized. At block 560, one or more of the indications generated at blocks 510-550 is outputted for display (e.g., on the mobile device 110 and/or a device of the merchant).

Figure 6:
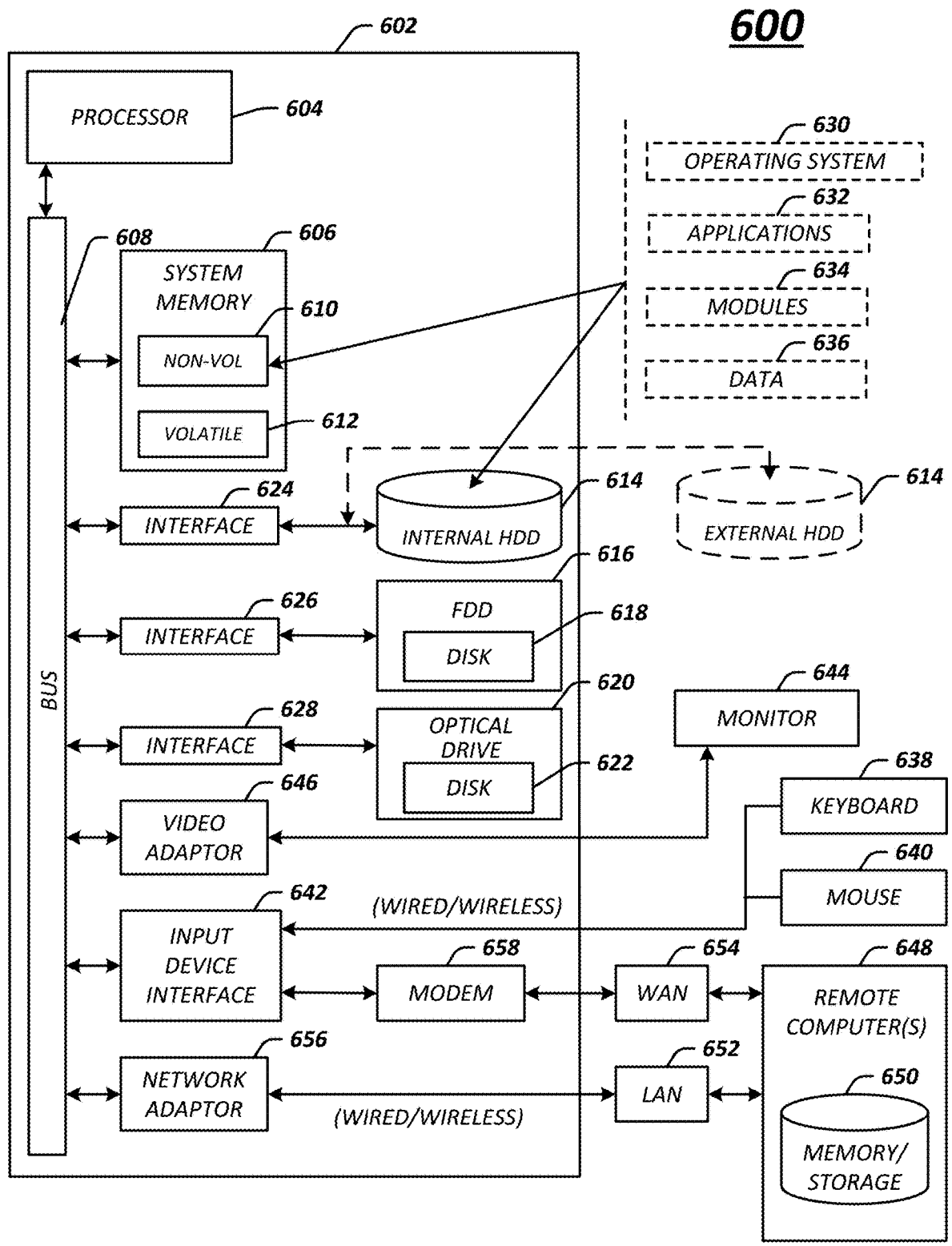
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the mobile devices 110, server 120, and the POS devices 140 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections.

Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100, e.g., the account application 113 and payment application 123.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 652 and the WAN 654.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
    receiving, by an application executing on a mobile device via a communications interface of a contactless card, encrypted data comprising an account identifier associated with the contactless card and transaction data for a transaction, the transaction data received by the contactless card from a point of sale (POS) device via the communications interface, the transaction data comprising an identifier of a merchant account, a timestamp, and an amount of the transaction, wherein a network connection between the POS device and a payment server is not available, wherein the contactless card encrypts the account identifier and the transaction data received from the POS device;
    determining, by the application, that an amount of time that has elapsed relative to the timestamp does not exceed a time threshold;
    determining, by the application, that a number of transactions processed by the payment server using the account identifier associated with the contactless card within an amount of time does not exceed a maximum transaction threshold;
    transmitting, by the application, the encrypted data to the payment server via a cellular network connection of the mobile device;
    receiving, by the application from the payment server via the cellular network connection of the mobile device, authorization of a payment for the transaction based at least in part on decryption of the encrypted data; and
generating, by the application, a confirmation reflecting the authorization of the payment for the transaction.

2. The method of claim 1, the transaction data further comprising an indication of an item or a service associated with the transaction, the confirmation comprising a fiducial marker encoding the transaction data, the method further comprising:
displaying the fiducial marker on a display of the mobile device, wherein the fiducial marker encodes the transaction data.

3. The method of claim 1, further comprising:
receiving, by the application from the payment server, the number of transactions processed by the payment server using the account identifier associated with the contactless card within the amount of time.

4. The method of claim 1, wherein the application transmits the encrypted data to the payment server based on the determinations that the amount of time that has elapsed relative to the timestamp does not exceed the time threshold and the number of transactions processed by the payment server does not exceed the maximum transaction threshold.

5. The method of claim 1, further comprising:
determining, by the application, global positioning system (GPS) coordinates of the mobile device; and
transmitting, by the application, the GPS coordinates to the payment server, the payment server to authorize the payment based on a determination that the GPS coordinates of the mobile device are within a predefined range of GPS coordinates associated with a location of the POS device.

6. The method of claim 1, further comprising:
authenticating, by the application, an account associated with the contactless card based on authentication input received from a user, the authentication input comprising one or more of biometric credentials and login credentials.

7. The method of claim 1, wherein the confirmation comprises one or more of: (i) an email, (ii) a uniform resource locator (URL), (iii) a text message, (iv) a confirmation string, and (v) a fiducial marker, the method further comprising:
transmitting, by the application, the confirmation to the POS device.

8. A non-transitory computer-readable storage medium storing computer-readable program code executable by a processor to cause the processor to:
receive, by an application executing on the processor via a communications interface of a contactless card, encrypted data comprising an account identifier associated with the contactless card and transaction data for a transaction, the transaction data received by the contactless card from a point of sale (POS) device via the communications interface, the transaction data comprising an identifier of a merchant account, a timestamp, and an amount of the transaction, wherein a network connection between the POS device and a payment server is not available, wherein the contactless card encrypts the account identifier and the transaction data received from the POS device;
determine, by the application, that an amount of time that has elapsed relative to the timestamp does not exceed a time threshold;
determine, by the application, that a number of transactions processed by the payment server using the account identifier associated with the contactless card within an amount of time does not exceed a maximum transaction threshold;
transmit, by the application, the encrypted data to the payment server via a cellular network connection;
receive, by the application from the payment server via the cellular network connection, authorization of a payment for the transaction based at least in part on decryption of the encrypted data; and
generate, by the application, a confirmation reflecting the authorization of the payment for the transaction.

9. The non-transitory computer-readable storage medium of claim 8, the transaction data further comprising an indication of an item or a service associated with the transaction, the confirmation comprising a fiducial marker encoding the transaction data, the medium further storing computer-readable program code executable by the processor to cause the processor to:
display the fiducial marker on a display device, wherein the fiducial marker encodes the transaction data.

10. The non-transitory computer-readable storage medium of claim 8, further storing computer-readable program code executable by the processor to cause the processor to:
receive, by the application from the payment server, the number of transactions processed by the payment server using the account identifier associated with the contactless card within the amount of time.

11. The non-transitory computer-readable storage medium of claim 8, wherein the application transmits the encrypted data to the payment server based on the determinations that the amount of time that has elapsed relative to the timestamp does not exceed the time threshold and the number of transactions processed by the payment server does not exceed the maximum transaction threshold.

12. The non-transitory computer-readable storage medium of claim 8, further storing computer-readable program code executable by the processor to cause the processor to:
determine, by the application, global positioning system (GPS) coordinates of a mobile device executing the application; and
transmit, by the application, the GPS coordinates to the payment server, the payment server to authorize the payment based on a determination that the GPS coordinates of the mobile device are within a predefined range of GPS coordinates associated with a location of the POS device.

13. The non-transitory computer-readable storage medium of claim 8, further storing computer-readable program code executable by the processor to cause the processor to:
authenticate, by the application, an account associated with the contactless card based on biometric credentials received from a user.

14. The non-transitory computer-readable storage medium of claim 8, further storing computer-readable program code executable by the processor to cause the processor to:
transmit, by the application, the confirmation to the POS device, wherein the confirmation comprises one or more of: (i) an email, (ii) a uniform resource locator (URL), (iii) a text message, (iv) a confirmation string, and (v) a fiducial marker.

15. A system, comprising:
a processor; and a memory storing instructions which when executed by the processor cause the processor to:
receive, by an application executing on the processor via a communications interface of a contactless card, encrypted data comprising an account identifier associated with the contactless card and transaction data for a transaction, the transaction data received by the contactless card from a point of sale (POS) device via the communications interface, the transaction data comprising an identifier of a merchant account, a timestamp, and an amount of the transaction, wherein a network connection between the POS device and a payment server is not available, wherein the contactless card encrypts the account identifier and the transaction data received from the POS device;
determine, by the application, that an amount of time that has elapsed relative to the timestamp does not exceed a time threshold;
determine, by the application, that a number of transactions processed by the payment server using the account identifier associated with the contactless card within an amount of time does not exceed a maximum transaction threshold;
transmit, by the application, the encrypted data to the payment server via a cellular network connection;
receive, by the application from the payment server via the cellular network connection, authorization of a payment for the transaction based at least in part on decryption of the encrypted data; and
generate, by the application, a confirmation reflecting the authorization of the payment for the transaction.

16. The system of claim 15, the transaction data further comprising an indication of an item or a service associated with the transaction, the confirmation comprising a fiducial marker encoding the transaction data, the memory storing instructions which when executed by the processor cause the processor to:
display the fiducial marker on a display device, wherein the fiducial marker encodes the transaction data.

17. The system of claim 15, the memory storing instructions which when executed by the processor cause the processor to:
receive, by the application from the payment server, the number of transactions processed by the payment server using the account identifier associated with the contactless card within the amount of time.

18. The system of claim 15, wherein the application transmits the encrypted data to the payment server based on the determinations that the amount of time that has elapsed relative to the timestamp does not exceed the time threshold and the number of transactions processed by the payment server does not exceed the maximum transaction threshold.

19. The system of claim 15, the memory storing instructions which when executed by the processor cause the processor to:
determine, by the application, global positioning system (GPS) coordinates of the system; and
transmit, by the application, the GPS coordinates to the payment server, the payment server to authorize the payment based on a determination that the GPS coordinates of the system are within a predefined range of GPS coordinates associated with a location of the POS device.

20. The system of claim 15, the memory storing instructions which when executed by the processor cause the processor to:
authenticate, by the application, an account associated with the contactless card based on biometric credentials received from a user; and
transmit, by the application, the confirmation to the POS device, wherein the confirmation comprises one or more of: (i) an email, (ii) a uniform resource locator (URL), (iii) a text message, (iv) a confirmation string, and (v) a fiducial marker.

* * * * *